US012600404B2

(12) United States Patent
Jin et al.

(10) Patent No.: US 12,600,404 B2
(45) Date of Patent: Apr. 14, 2026

(54) ELECTRONICALLY CONTROLLED STEERING METHOD AND STEERING SYSTEM FOR VEHICLE

(71) Applicant: Volvo Car Corporation, Gothenburg (SE)

(72) Inventors: Yongxing Jin, Shanghai (CN); Jiangliu Su, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 44 days.

(21) Appl. No.: 18/780,687

(22) Filed: Jul. 23, 2024

(65) Prior Publication Data

US 2025/0042468 A1 Feb. 6, 2025

(30) Foreign Application Priority Data

Aug. 2, 2023 (CN) .......................... 202310963304.7

(51) Int. Cl.
B62D 5/12 (2006.01)
B62D 6/00 (2006.01)
B62D 7/18 (2006.01)

(52) U.S. Cl.
CPC ................ B62D 5/12 (2013.01); B62D 6/00 (2013.01); B62D 7/18 (2013.01)

(58) Field of Classification Search
CPC ... B62D 5/12; B62D 6/00; B62D 7/18; B62D 7/10; B62D 5/091; B62D 6/002; B62D 7/1509; B62D 5/04; B62D 5/06; B62D 5/065; B62D 6/007
USPC ......................................................... 701/41
See application file for complete search history.

(56) References Cited

U.S. PATENT DOCUMENTS

2017/0328387 A1 11/2017 Pryssander

FOREIGN PATENT DOCUMENTS

| CN | 1702007 A | 11/2005 | |
|---|---|---|---|
| CN | 101687455 B | * 4/2012 | ............. B60G 7/006 |
| CN | 113492906 A | 10/2021 | |
| CN | 215097809 U | 12/2021 | |

(Continued)

OTHER PUBLICATIONS

Jan. 10, 2025 European Search Report issued in Corresponding EP Application No. 24190358.2.

*Primary Examiner* — Lindsay M Low
*Assistant Examiner* — Omar Morales
(74) *Attorney, Agent, or Firm* — Clements Bernard Walker; Christopher L. Bernard

(57) ABSTRACT

An electronically controlled steering method and a steering system for a vehicle. The method includes: receiving steering parameters, including steering input torque, a steering input angle, vehicle speed, lateral acceleration of the vehicle and actual piston positions of pistons of respective hydraulic wheel cylinders; determining a target steering radius for the vehicle and target piston positions of the pistons of the respective hydraulic wheel cylinders based on the steering parameters; and controlling, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering.

18 Claims, 8 Drawing Sheets

(56)     References Cited

FOREIGN PATENT DOCUMENTS

DE      4334279  A1    4/1995
FR      2850937  A1    8/2004

* cited by examiner

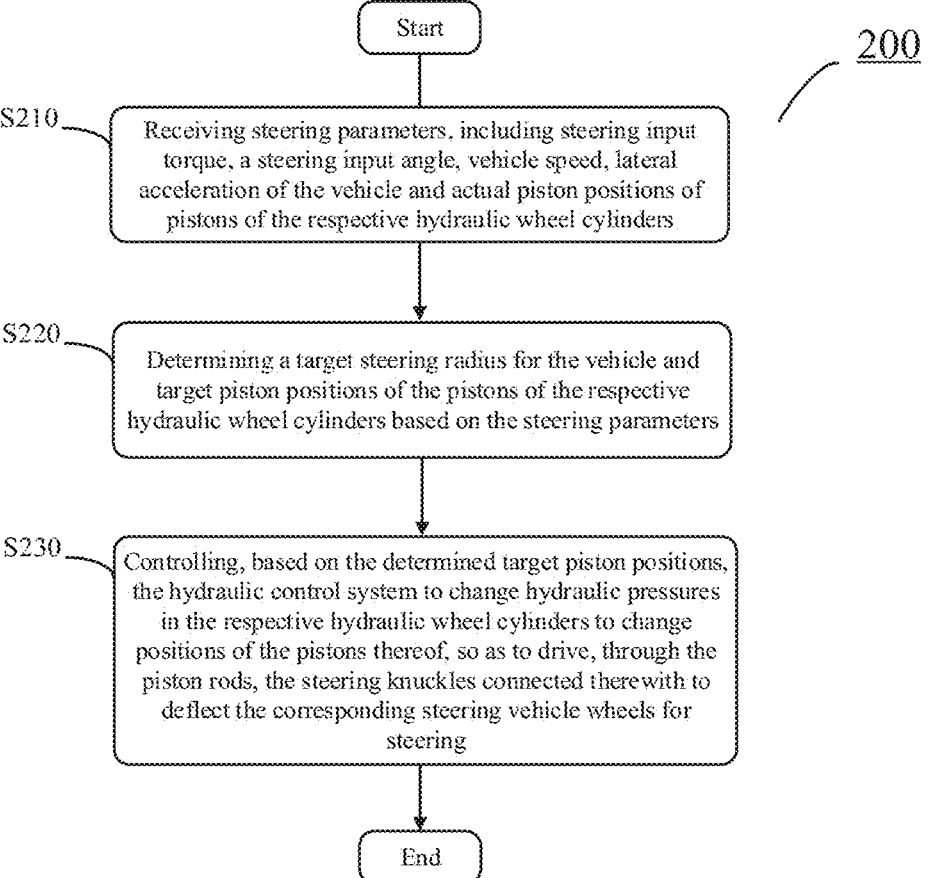

S210 — Receiving steering parameters, including steering input torque, a steering input angle, vehicle speed, lateral acceleration of the vehicle and actual piston positions of pistons of the respective hydraulic wheel cylinders S220 — Determining a target steering radius for the vehicle and target piston positions of the pistons of the respective hydraulic wheel cylinders based on the steering parameters S230 — Controlling, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering

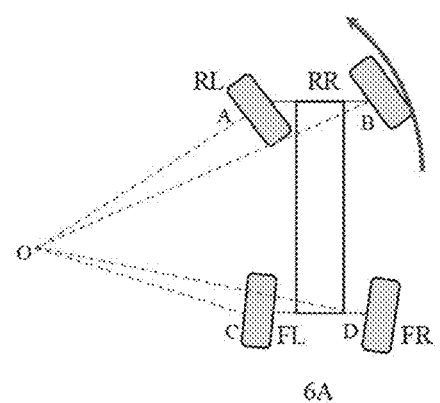
6A
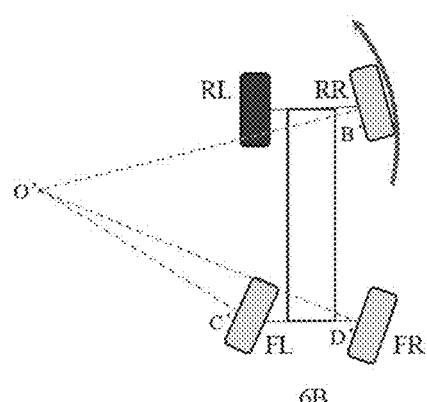
6B
Fig. 6

ELECTRONICALLY CONTROLLED STEERING METHOD AND STEERING SYSTEM FOR VEHICLE

CROSS-REFERENCE TO RELATED APPLICATION

The present disclosure claims priority to Chinese Patent Application No. 202310963304.7, filed Aug. 2, 2023, which is expressly incorporated by reference in its entirety.

TECHNICAL FIELD

The present disclosure relates to an electronically controlled steering method and a steering system for a vehicle.

BACKGROUND

A steering system, which is an important constituent part of a vehicle, functions to manipulate the steering wheel through the driver and deflect the steering vehicle wheels on the road surface via a transmission mechanism, so as to control the driving direction of the vehicle according to the driver's intention, which ensures stable and safe normal driving of the vehicle. In the whole developing process of steering system, it has experienced an evolution from pure mechanical manual control relying on the driver's turning the steering wheel with hands to powered steering.

In recent years, with the continuous development of automatic driving technology, electronically controlled steering, such as steering-by-wire (SBW) system, has become more and more prevalent in vehicles, and is also an emerging and hot developing direction of steering technology. The electronically controlled steering system can cancel the conventional mechanical linkage that links the steering wheel of the vehicle to its steering vehicle wheels, and instead, convert for example a mechanical steering wheel input into an electrical signal and transfer it to the steering gear of the vehicle chassis for steering control, thus getting rid of various restrictions for the traditional steering system.

However, with the increasing demand for electronically controlled steering, there is still a need for further improvement and optimization of the electronically controlled steering method for the vehicle.

SUMMARY

In one aspect, the present disclosure provides an electronically controlled steering method for a vehicle including an electronically controlled steering system, the electronically controlled steering system including a hydraulic control system, steering knuckles disposed at respective steering vehicle wheels, and hydraulic wheel cylinders connected with respective steering knuckles through piston rods, the method comprising: receiving steering parameters, including steering input torque, a steering input angle, vehicle speed, lateral acceleration of the vehicle and actual piston positions of pistons of the respective hydraulic wheel cylinders; determining a target steering radius for the vehicle and target piston positions of the pistons of the respective hydraulic wheel cylinders based on the steering parameters; and controlling, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering.

In another aspect, the present disclosure further provides a steering system of a vehicle, the steering system comprising: an electronically controlled steering system including a hydraulic control system, steering knuckles disposed at respective steering vehicle wheels, and hydraulic wheel cylinders connected with the respective steering knuckles through piston rods; and a first control circuit configured to: receive steering parameters, including steering input torque, a steering input angle, vehicle speed, lateral acceleration of the vehicle and actual piston positions of pistons of the respective hydraulic wheel cylinders; determine a target steering radius for the vehicle and target piston positions of the pistons of the respective hydraulic wheel cylinders based on the steering parameters; and control, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering.

In yet another aspect, the present disclosure further provides a vehicle including a steering system, the steering system comprising: an electronically controlled steering system including a hydraulic control system, steering knuckles disposed at respective steering vehicle wheels, and hydraulic wheel cylinders connected with the respective steering knuckles through piston rods; and a first control circuit configured to: receive steering parameters, including steering input torque, a steering input angle, vehicle speed, lateral acceleration of the vehicle and actual piston positions of pistons of the respective hydraulic wheel cylinders; determine a target steering radius for the vehicle and target piston positions of the pistons of the respective hydraulic wheel cylinders based on the steering parameters; and control, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering.

BRIEF DESCRIPTION OF THE DRAWINGS

In order to illustrate the technical scheme of the embodiments of the present disclosure more clearly, the accompanying drawings of the embodiments will be briefly introduced below. Obviously, the accompanying drawings in the following description merely relate to some of the embodiments of the present disclosure, and are not limitative to the present disclosure.

FIG. 2 illustrates an example electronically controlled steering method according to at least one embodiment of the present disclosure.

FIG. 6 illustrates an example scenario in which a failure occurs in a steering vehicle wheel of a vehicle.

DETAILED DESCRIPTION

Figure 1:
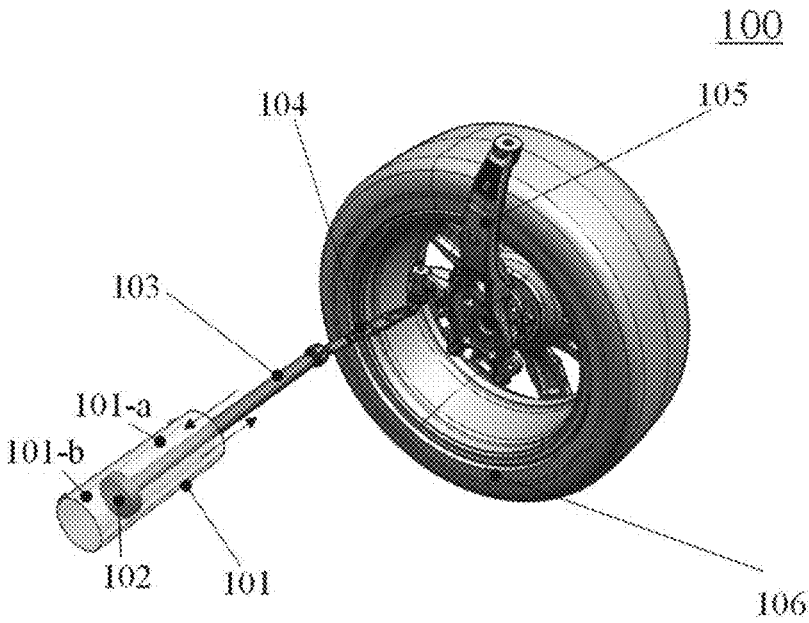
FIG. 1 illustrates a schematic diagram of a steering device suitable for an electronically controlled steering method according to at least one embodiment of the present disclosure.

In order to make the purpose, technical scheme and advantages of the technical scheme of the present disclosure more clear, a clear and complete description of the technical scheme of the embodiments of the present disclosure will be made below in conjunction with the accompanying drawings of specific embodiments of the present disclosure. Like reference numerals in the accompanying drawings represent like parts. It should be noted that the described embodiments are a part of the embodiments of the present disclosure, not all of the embodiments. Based on the described embodiments of the present disclosure, all the other embodiments derived by the ordinary skilled in the art without creative labor belong to the protection scope of the present disclosure.

Unless otherwise defined, technical terms or scientific terms used herein shall have their common meanings as understood by those ordinary skilled in the art to which the present disclosure belongs. Words such as "first", "second" and the like used in the specification and claims of the present disclosed patent application do not represent any order, quantity or importance, but are only used to distinguish between different constituent parts. Likewise, word such as "a", "an" or the like does not necessarily represent quantitative restrictions. Word such as "include", "contain" or the like means that the elements or items preceding to the word encompass the elements or items listed after the word and the equivalents thereof, without excluding other elements or items. Word such as "connect", "interconnect" or the like is not limited to physical or mechanical connection, but can include electrical connection, whether direct or indirect. Words such as "up", "down", "left", "right" and the like are only used to represent a relative positional relationship, in which after the absolute position of the described object changes, the relative positional relationship might accordingly change as well.

FIG. 1 illustrates a schematic diagram of a steering device 100 suitable for an electronically controlled steering method according to at least one embodiment of the present disclosure. As shown in FIG. 1, for example, taking the right front wheel as the steering vehicle wheel, the steering device 100 may include a hydraulic wheel cylinder (which includes a cylinder body 101, a piston 102 and a piston rod 103), a steering tie rod 104, a steering knuckle 105 and a steering vehicle wheel 106. The steering knuckle 105 is disposed at each of the steering vehicle wheels (e.g., the steering vehicle wheel 106) of the vehicle to drive the steering vehicle wheel 106 to deflect. Exemplarily, each hydraulic wheel cylinder includes a cylinder body 101 fixedly mounted on a vehicle frame, and a piston rod 103 and a piston 102 extending and contracting within the cylinder body 101. The rod chamber 101-*a* and a rodless chamber 101-*b* are formed within the cylinder body 101, and a piston rod 103 is connected with a steering knuckle 105. A control circuit (e.g., electronic control unit (ECU)) controls the hydraulic control system to change the hydraulic pressure of the hydraulic wheel cylinder (i.e., the hydraulic pressure between the rod cavity 101-*a* and the rodless cavity 101-*b*) so that the piston rod 103 extends and contracts within the cylinder body 101, thereby driving the steering knuckle 105 to move, and finally driving the steering vehicle wheel 106 to deflect by a specific angle corresponding to a steering control signal. In the present disclosure, a steering vehicle wheel is a wheel that can be deflected under the control of the steering system of the vehicle among the wheels of the vehicle. In an embodiment, the left front wheel and the right front wheel of the vehicle may be the steering vehicle wheels. In another embodiment, all of the wheels of the vehicle may be the steering vehicle wheels. For example, in an embodiment where the vehicle has four wheels, the left front wheel, the right front wheel, the left rear wheel and the right rear wheel of the vehicle may all be the steering vehicle wheels. In a case that all of the wheels of the vehicle are the steering vehicle wheels, more postures of the steering of the vehicle can be achieved (as described later with reference to FIG. 4), which contributes to the smooth and rapid steering for vehicle. In various embodiments, as shown in FIG. 1, a steering knuckle may be disposed at each of the steering vehicle wheels, and each of the steering knuckles is connected with a hydraulic wheel cylinder through a piston rod.

In the present disclosure, the hydraulic control system and the control circuit may be the hydraulic control system and the control circuit that are well known in the art. For example, the hydraulic control system may include a pressure oil way, a return oil way and at least one hydraulic element corresponding to at least one hydraulic wheel cylinder. Each hydraulic element controls a connected state of the rod cavity and the rodless cavity of a corresponding hydraulic wheel cylinder with the pressure oil way and the return oil way. The control circuit can be implemented by a processor or a field programmable gate array (FPGA), etc.

It can be understood that although FIG. 1 shows that the piston rod 103 is connected with the steering knuckle 105 through the steering tie rod 104, the piston rod 103 may also be connected with the steering knuckle 105 in various ways, such as soldering, screw joint, etc., so as to drive the steering knuckle 105 to deflect the steering vehicle wheel 106 by means of the expansion and contraction of the piston rod 103. The present disclosure does not impose any restrictions on the above specific implementations of connections.

FIG. 2 illustrates an example electronically controlled steering method 200 suitable for the steering device 100 shown in FIG. 1 according to at least one embodiment of the present disclosure. As shown in FIG. 2, the example electronically controlled steering method 200 according to an embodiment of the present disclosure may begin at S210. At S210, the control circuit of the steering system of the vehicle may receive steering parameters. The steering parameters may include, for example, steering input torque, a steering input angle, vehicle speed, lateral acceleration of the vehicle, and actual piston positions of pistons of respective hydraulic wheel cylinders corresponding to respective steering vehicle wheels. It should be understood that the steering input torque, the steering input angle, the vehicle speed, the lateral acceleration of the vehicle and the actual piston positions of pistons of respective hydraulic wheel cylinders are merely examples of steering parameters and are not limited, and the steering parameters may include more or fewer parameters. For example, the steering parameters may further include longitudinal acceleration, etc.

In the present disclosure, the steering input torque is a steering-related torque that is input to the steering system of the vehicle. The steering input angle is a steering-related angle that is input to the steering system of the vehicle. In an embodiment, the steering input torque and steering input angle may be input manually. For example, in an embodiment of steering by turning the steering wheel, the driver of the vehicle is able to input the steering input torque and the steering input angle by turning the steering wheel. In this case, the steering input torque and the steering input angle may be steering wheel torque and steering wheel angle. In other embodiments, for example, in an embodiment of controlling the steering through buttons, the steering input torque and the steering input angle may be input through buttons. In another embodiment, the steering input torque and the steering input angle may be determined based on a steering request from an automatic driving system or a driving assistance system of the vehicle. In this case, the automatic driving system or the driving assistance system may automatically achieve the steering without the driver's operation.

At S220, the control circuit of the steering system of the vehicle may determine a target steering radius for the vehicle and target piston positions of the pistons of the respective hydraulic wheel cylinders based on the steering parameters received at S210. In an embodiment, the target steering radius and the target piston positions may be determined based on the steering parameters by the following steps: determining an actual steering radius of the vehicle based on the vehicle speed and the lateral acceleration of the vehicle; and determining the target steering radius and the target piston positions of the pistons of the respective hydraulic wheel cylinders based on the actual steering radius, the steering input torque, the steering input angle, the vehicle speed, and the actual piston positions of the pistons of the respective hydraulic wheel cylinders. In other embodiments, the target steering radius and the target piston positions of the pistons of the respective hydraulic wheel cylinders may be determined based on the steering parameters without determining the actual steering radius. Compared with the method for determining the target steering radius and the target piston positions directly based on the steering parameters (e.g., through a look-up table) without determining the actual steering radius, the overall computational complexity of determining the target steering radius and the target piston positions can be reduced by determining the actual steering radius and determining the target steering radius and the target piston positions based on the determined actual steering radius and other steering parameters.

In the present disclosure, in an embodiment, the lateral acceleration of the vehicle may be the lateral acceleration of one of the steering vehicle wheels of the vehicle. For example, in an embodiment where the steering vehicle wheels of the vehicle includes the left front wheel and the right front wheel, the lateral acceleration of the vehicle may be the lateral acceleration of the right front wheel of the vehicle. In this case, the actual steering radius may be the actual steering radius of the right front wheel of the vehicle, and the target steering radius may be the target steering radius of the right front wheel of the vehicle. In another embodiment, the lateral acceleration of the vehicle may be the lateral accelerations of the respective steering vehicle wheels of the vehicle. Accordingly, the actual steering radius may be the actual steering radiuses of the respective steering vehicle wheels of the vehicle, and the target steering radius may be the target steering radiuses of the respective steering vehicle wheels of the vehicle. In this case, since the target steering radiuses of the respective steering vehicle wheels and the target piston positions of the respective hydraulic wheel cylinders are determined based on the lateral accelerations of the respective steering vehicle wheels of the vehicle, the determined target steering radius and the target piston positions can be made more accurate. In yet another embodiment, the lateral acceleration of the vehicle may be the lateral acceleration at an equivalent center of mass of the vehicle, which may be determined based on the lateral accelerations of the respective steering vehicle wheels of the vehicle. Exemplarily, the lateral acceleration at the equivalent center of mass of the vehicle may be a weighted sum of the lateral accelerations of the respective steering vehicle wheels of the vehicle. In this case, the actual steering radius may be the actual steering radius at the equivalent center of mass of the vehicle, and the target steering radius may be the target steering radius at the equivalent center of mass of the vehicle. In this way, a good tradeoff between the accuracy and the computational complexity of the determined target steering radius and target piston positions can be achieved.

In a further embodiment, the target steering radius and the target piston position may be used as feedback to determine the target steering radius and the target piston positions at next timing through closed-loop control. In this way, the target steering radius and the target piston positions determined based on the received steering parameters can be adjusted based on the feedback of both the target steering radius and the target piston positions, so that the determined target steering radius and target piston positions are more accurate.

When determining the target steering radius and the target piston positions based on the steering parameters, in an embodiment, the target steering radius and the target piston positions may be determined based on the received steering parameters through a look-up table. The look-up table may be predetermined based on test. In an embodiment, the target steering radius and the target piston positions of the vehicle may be determined based on the steering parameters through the look-up table, based on a flowchart shown in FIG. 3. It should be understood that the target piston positions of the respective pistons can be determined based on the steering parameters by means of other methods (e.g., a neural network, etc.) in addition to the look-up table.

Figure 3:
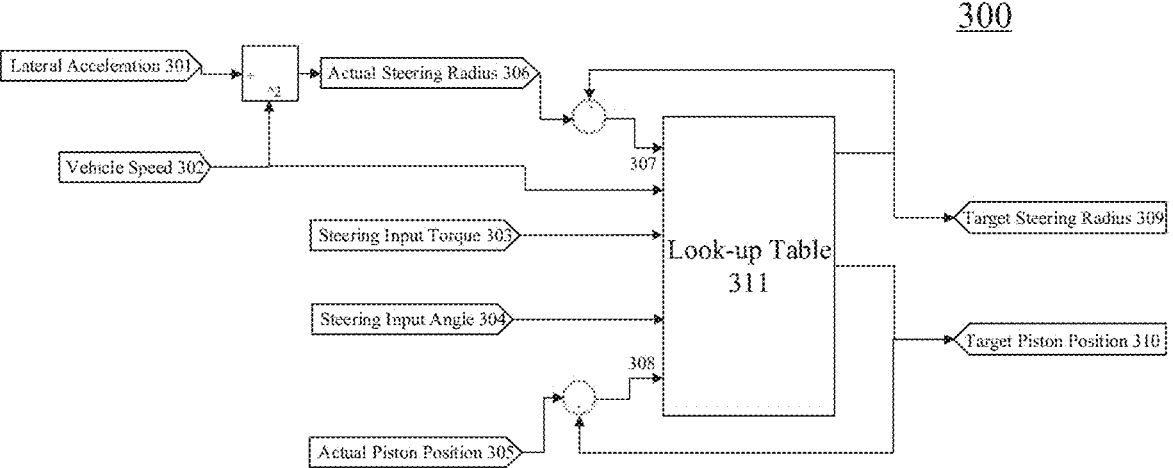
FIG. 3 is a flowchart further illustrating an example method for determining a target steering radius and target piston positions of a vehicle based on steering parameters at step S220 in FIG. 2.

As shown in FIG. 3, an actual steering radius 306 may be determined based on the received lateral acceleration of vehicle 301 and vehicle speed 302; a steering radius difference 307 between the actual steering radius 306 and a target steering radius 309 for the previous timing may be determined; a piston position difference 308 between an actual piston position 305 and a target piston position 310 for the previous timing may be determined; then, the target steering radius and the target piston position may be determined by using the vehicle speed 302, the steering input torque 303, the steering input angle 304, the determined steering radius difference 307 and piston position difference 308 in the received steering parameters as inputs a look-up table 311 for determining the target steering radius and the target piston position.

Returning to FIG. 2, at S230, the control circuit of the steering system of the vehicle controls, based on the target piston positions of the pistons of the respective hydraulic wheel cylinders determined at S220, the hydraulic control system of the steering system of the vehicle to change hydraulic pressures in the respective hydraulic wheel cylinders to change positions of the pistons thereof, so as to drive, through piston rods, the steering knuckles connected therewith to deflect the corresponding steering vehicle wheels for steering. Exemplarily, the control circuit may control, based on the determined target piston positions of the respective hydraulic wheel cylinders, each hydraulic element of the hydraulic control system, so as to control parameters such as a flow direction, a flow volume, a speed of hydraulic oil within each hydraulic wheel cylinder, so as to cause a piston within a corresponding hydraulic wheel cylinder to move towards the target piston position, and in turn, to drive, through a piston rod, the steering knuckle connected therewith to deflect the corresponding steering vehicle wheel towards a desired direction, thus achieving a desired steering.

In the above, the present disclosure describes an electronically controlled steering method for a vehicle according to the embodiments of the present disclosure in conjunction with FIGS. 1 to 3. The electronically controlled steering method of the present disclosure can support various steering postures of the vehicle (e.g., steering postures shown in FIG. 4), which contributes to the smooth and rapid steering for vehicle. Moreover, adjusting, based on the feedback of both the target steering radius and the target piston position, the target steering radius and the target piston position determined based on the received steering parameters, as described in conjunction with FIG. 3, can make the determined target steering radius and target piston position more accurate.

Figure 4:
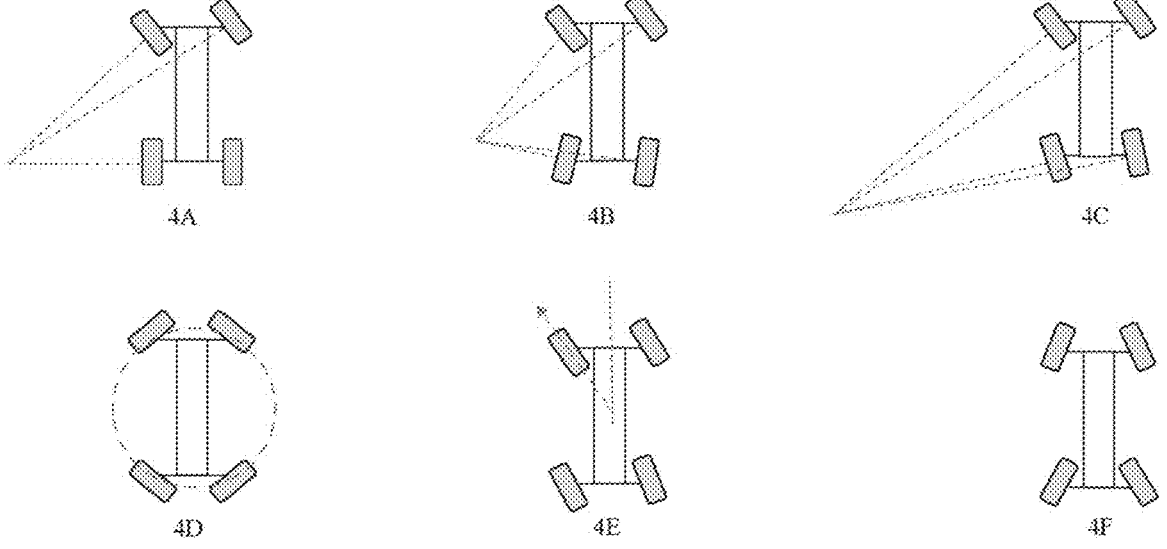
FIG. 4 illustrates steering postures supported by an electronically controlled steering method according to at least one embodiment of the present disclosure.

FIG. 4 illustrates steering postures supported by an electronically controlled steering method according to at least one embodiment of the present disclosure. FIG. 4 illustrates steering postures supportable by the electronically controlled steering method according to the embodiments of the present disclosure in a case that all four wheels of a four-wheeled vehicle are steering vehicle wheels. Exemplarily, the electronically controlled steering method of the present disclosure can support all-wheel steering as shown in diagrams 4B and 4C in FIG. 4, in which FIG. 4B may be all-wheel steering at low speed, which can reduce the turning radius compared with the conventional front-wheel steering as shown in diagram 4A in FIG. 4, thus increasing the maneuverability of the vehicle. Diagram 4C in FIG. 4 may be all-wheel steering at high speed, which can increase the turning radius compared with the conventional front-wheel steering as shown in diagram 4A in FIG. 4, thus increasing the smoothness for the steering of the vehicle. Diagram 4D in FIG. 4 shows all-wheel steering for pivot steering operation. Diagram 4E in FIG. 4 shows all-wheel steering with constant vehicle direction, in which the direction of the vehicle body may be kept constant during the steering. Diagram 4F in FIG. 4 shows dynamic toe-in/toe-out all-wheel steering, which can increase stability for the steering of the vehicle. It should be understood that the vehicle steering postures described in FIG. 4 are merely examples of the steering postures supportable by the electronically controlled steering method according to the embodiments of the present disclosure, and is not limited.

Figure 5:
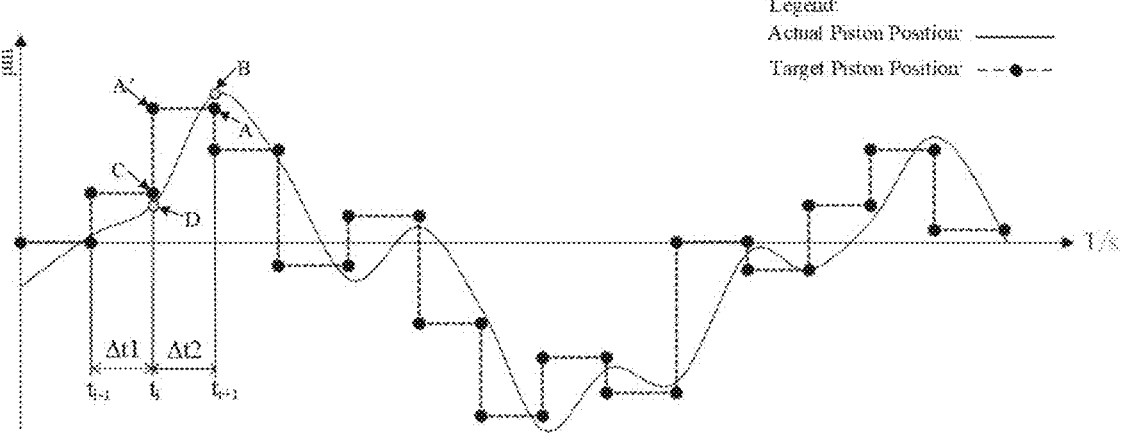
FIG. 5 illustrates a graph in which a piston of a hydraulic wheel cylinder of a steering vehicle wheel moves with a target piston position under an electronically controlled steering method according to at least one embodiment of the present disclosure.

FIG. 5 illustrates a graph in which a piston of a hydraulic wheel cylinder of a steering vehicle wheel moves with a target piston position under an electronically controlled steering method according to at least one embodiment of the present disclosure. As shown in FIG. 5, the control circuit of the steering system of the vehicle may control the hydraulic control system according to the electronically controlled steering method of the embodiments of the present disclosure, so that a piston of a hydraulic wheel cylinder move towards a target piston position within a stepping time (e.g., the stepping time $\Delta t1$ and $\Delta t2$ shown in FIG. 5), thus achieving a desired steering of the vehicle. In FIG. 5, the current actual piston position (e.g., the actual piston position B in FIG. 5) is the position of the piston of the hydraulic wheel cylinder at the beginning (e.g., at ti+1) of the stepping time (e.g., $\Delta t2$). The target piston position (e.g., the target piston position A in FIG. 5) corresponding to the current actual piston position (e.g., the actual piston position B in FIG. 5) is the target piston position determined according to the electronically controlled steering method of the embodiments of the present disclosure within the previous stepping time (e.g., $\Delta t1$), that is, the target piston position (e.g., the target piston position A' in FIG. 5) determined at the end (i.e., at ti) of the previous stepping time (e.g., $\Delta t1$). FIG. 5 is a graph showing that a piston of a hydraulic wheel cylinder corresponding to a steering vehicle wheel moves with the target piston position under the electronically controlled steering method according to the embodiments of the present disclosure. The graph of change in positions of pistons of hydraulic wheel cylinders corresponding to other steering vehicle wheels is similar to that shown in FIG. 5. In practice, there may be over damping or overshoot in the actual piston position to ensure the control stability and response time.

In addition, as can be seen from FIG. 5, the actual piston position (e.g., the actual piston position B in FIG. 5) is not the same as the target piston position (e.g., the target piston position A in FIG. 5). Therefore, in some embodiments, the determined target piston position may be further adjusted based on a difference between the target piston position and the actual piston position. Exemplarily, the determined target piston position (e.g., the target piston position A') may be further adjusted by adding a difference between the target piston position and the actual piston position for the previous timing (e.g., a difference between the target piston position C and the actual piston position D) to the target piston position (e.g., the target piston position A') determined at S220 as shown in FIG. 2. Unlike the determining of the target piston position at the next timing through for example a predetermined look-up table by using the target piston position as the feedback as described above, this method can adjust the target piston position based on the actual operating condition of the steering system of the vehicle, so that a desired target steering can be achieved more accurately.

In practice, there may be a situation where a steering failure occurs in a steering vehicle wheel. For example, a leak occurs in a hydraulic wheel cylinder, a failure occurs in an element in the hydraulic control system corresponding to a certain steering vehicle wheel, and so on. FIG. 6 illustrates a situation where a steering failure occurs the left front steering vehicle wheel (RL in FIG. 6) of the vehicle. In this situation, other target piston positions of pistons of respective hydraulic wheel cylinders corresponding to the steering vehicle wheels without steering failure among the respective steering vehicle wheels may be determined based on the steering parameters as described above. Then, based on the determined other target piston positions, the hydraulic control system is controlled to change the hydraulic pressures of the respective hydraulic wheel cylinders corresponding to the steering vehicle wheels without steering failure, so as to change positions of the pistons thereof, thus achieving the steering. In this way, the desired steering can be achieved even if a steering failure occurs in one or more of the steering vehicle wheels. In an embodiment, the other target piston positions may be determined based on the steering parameters by means of the method described above in conjunction with FIGS. 2-3. For example, the other target piston positions may be determined through a look-up table corresponding to the steering vehicle wheels without steering failure (e.g., in the case of FIG. 6, a look-up table corresponding to steering vehicle wheels without steering failure (i.e., steering vehicle wheels RR, FL, and FR in FIG. 6)) based on the actual steering radius, the steering input torque, the steering input angle, the vehicle speed, and the actual piston positions of the pistons of the respective hydraulic wheel cylinders corresponding to the steering vehicle wheels without steering failure.

In addition, the inventors of the present disclosure have observed that in order to achieve the desired steering, the target steering radiuses determined (e.g., by means of the method described above in conjunction with FIGS. 2-3) based on the steering parameters are the same, regardless of whether there is a steering vehicle wheel with steering failure among the steering vehicle wheels. For example, in the example of FIG. 6, the target steering radiuses OB, OC and OD determined when there is no steering failure in the steering vehicle wheel are respectively equal to the target steering radiuses OB', OC' and OD' determined when a failure occurs in the left front steering vehicle wheel (i.e., RL in FIG. 6) among the steering vehicle wheels. Based on this observation, the present disclosure proposes another method for determining other target piston positions of pistons of respective hydraulic wheel cylinders corresponding to steering vehicle wheels without steering failure among respective steering vehicle wheels based on the steering parameters when a failure occurs in a steering vehicle wheel. The method includes: determining an indication of a steering direction based on the steering input angle in the steering parameters; and determining the other target piston positions based on the determined indication of the steering direction and the target steering radius determined on the assumption that there is no steering failure. Exemplarily, in an embodiment, the other target piston positions may be determined by using, the indication of the steering direction and the target steering radius, as inputs to a look-up table for determining the target piston position corresponding to the steering vehicle wheels without steering failure. For example, in the example of FIG. 6, the indication of the steering direction, that is, an indication of turning left, may be determined based on the steering input angle. Then, the other target piston positions are determined based on the indication of turning left and the target steering radiuses OB, OC and OD as the inputs to the look-up table corresponding to the steering vehicle wheels RR, FL and FR without steering failure, so that the steering posture shown in diagram 6B in FIG. 6 is achieved based on the determined other target piston positions, thus achieving the desired steering.

Compared with the method described above for example in conjunction with FIG. 3 of determining other target piston positions when a failure occurs in a steering vehicle wheel, the method for determining other target piston positions based on the indication of the steering direction and the target steering radius can reduce the storage space and improve the calculation speed. For example, in an example of using a look-up table, the method described in conjunction with FIG. 3 requires one five-input look-up table (i.e., a five-dimensional look-up table), whereas the method based on the indication of steering direction and the target turning radius only requires two one-input look-up tables (i.e., two one-dimensional look-up tables corresponding to the indication of turning left and the indication of turning right respectively), in which the latter can significantly reduce the storage space and improve the search speed.

Figure 7:
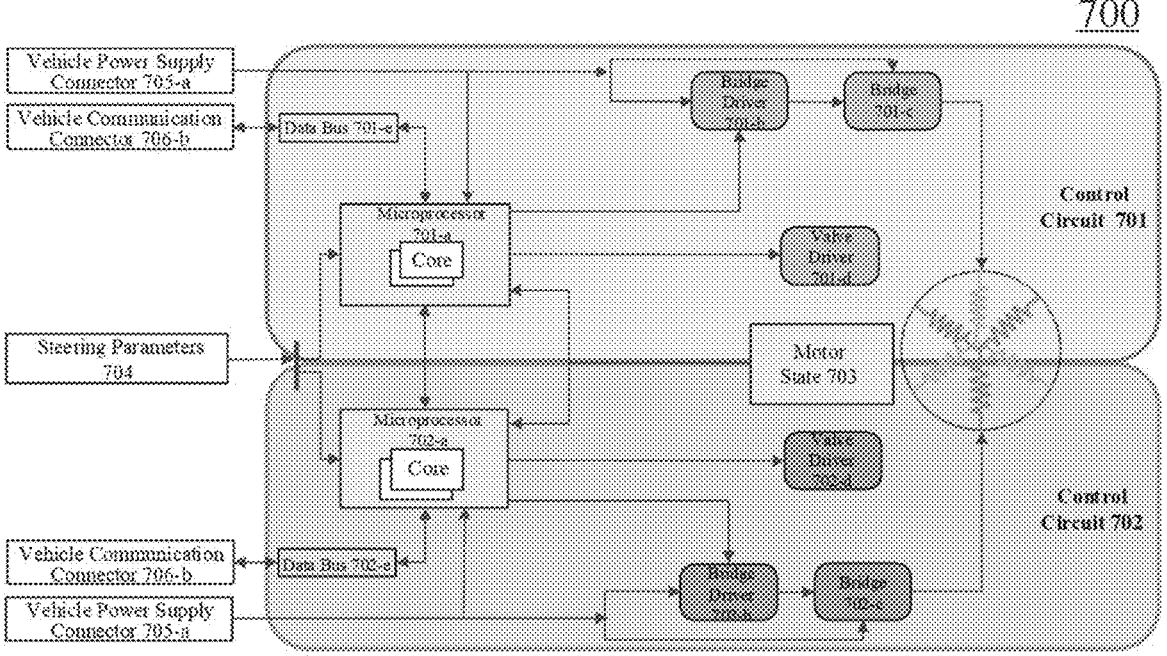
FIG. 7 illustrates an example architecture of a control circuit for controlling a hydraulic steering system according to at least one embodiment of the present disclosure.

FIG. 7 illustrates an example architecture 700 of a control circuit of controlling a hydraulic steering system according to at least one embodiment of the present disclosure. As shown in FIG. 7, the electronically controlled steering system according to an embodiment of the present disclosure may include a first control circuit 701 and a second control circuit 702 as shown in FIG. 7. The control circuit 701 may include a microprocessor 701-a, a bridge driver 701-b, a bridge 701-c, a valve driver 701-d and a data bus 701-e. The control circuit 702 may include a microprocessor 702-a, a bridge driver 702-b, a bridge 702-c, a valve driver 702-d and a data bus 702-e. The control circuit 701 may be connected with a power supply of the vehicle through a vehicle power supply connector 705-a, and connected with a vehicle communication connector 706-b of the vehicle through the data bus 701-e. Similarly, the control circuit 702 may be connected with the power supply of the vehicle through the vehicle power supply connector 705-a, and connected with the vehicle communication connector 706-b of the vehicle through the data bus 702-e. It should be understood that the example architecture of the control circuit shown in FIG. 7 is merely an example and not a restriction. For example, the control circuit(s) included in the electronically controlled steering system according to the embodiments of the present disclosure may include more or fewer elements than the control circuit 701 or 702 shown in FIG. 7. Alternatively, the control circuits for controlling the hydraulic steering system may be implemented in a different manner from that of the control circuits shown in FIG. 7.

The control circuits 701 and 702 may perform the electronically controlled steering method described above in conjunction with FIGS. 1-6 independently, that is, determine the target piston positions of the pistons of the respective hydraulic wheel cylinders based on the steering parameters 704, and control the hydraulic control system of the steering system of the vehicle based on the determined target piston positions. In an example, the control circuit 701 and the control circuit 702 may be respectively connected to three phases in a six-phase motor stator in the hydraulic control system, so that any of the control circuits can carry out a complete control over the output of the motor of the hydraulic control system, thus controlling the hydraulic control system independently. In addition, the control circuit 701 and the control circuit 702 may also control the hydraulic control system based on the monitored state of the motor in the hydraulic control system.

In an embodiment, the control circuit 701 may act as a main control circuit to calculate the target piston positions and control the hydraulic control system based thereon, whereas the control circuit 702 may act as a backup control circuit in standby state. When the control circuit 701 fails due to a malfunction, the second control circuit 702 may immediately take over control. This may be achieved by, for example, making the microprocessor 701-a and microprocessor 702-a in the control circuit 701 and control circuit 702 to be a pair of interlocked microprocessors. In this way, redundancy requirements for control and execution of electronically controlled steering can be satisfied. In the present disclosure, a control circuit may fail due to the following factors: a failure or dump in power supply from the vehicle power supply connector to the control circuit, a failure in communication from the vehicle communication connector to the control circuit through the data bus, a loss of sensor signal of the control circuit, an internal component failure detected in the control circuit, an internal component failure detected in the bridge drive, an internal component failure detected in the valve drive, and so on.

In addition, in some embodiments, both the control circuit 701 and the control circuit 702 shown in FIG. 7 may respectively determine the target steering radiuses and the target piston positions according to the electronically controlled steering method described above in conjunction with FIGS. 1-6, and cross-check the determined target steering radiuses and target piston positions, further increasing the robustness of the electronically controlled steering method of the present disclosure. Exemplarily, the cross-checking may be carried out by means of the following method. When the target steering radiuses and target piston positions determined by the control circuit 701 and the control circuit 702 are inconsistent but close (e.g., the difference therebetween is within a first predetermined range), as long as the control circuit 701 does not detect a malfunction, the control is carried out with the calculation result by the control circuit 701 as the output. When the target steering radiuses and the target piston positions determined by the control circuit 701 and the control circuit 702 are inconsistent and have a large difference (e.g., the difference therebetween is outside the first predetermined range), no matter whether a malfunction is detected or not, only the calculation result of a last (not the current) calculation cycle (e.g., before 50 ms) is used for control. When the calculation results by the control circuit 701 and the control circuit 702 are quite different for many consecutive times (e.g., within 10 calculation cycles), the system sends an alarm reminder.

In the above, the present disclosure describes an electronically controlled steering method for a vehicle according to the embodiments of the present disclosure in conjunction with FIGS. 1 to 7. Hereinafter, the present disclosure will describe a steering system of a vehicle according to an embodiment of the present disclosure in conjunction with FIG. 8.

Figure 8:
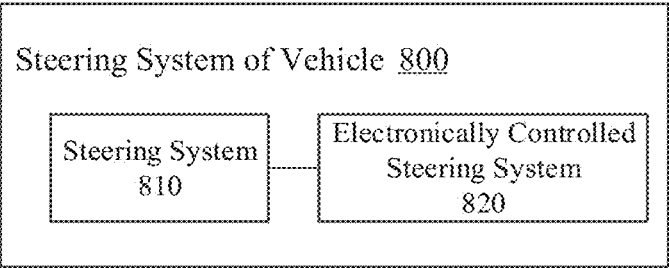
FIG. 8 illustrates an example steering system of a vehicle according to at least one embodiment of the present disclosure.

FIG. 8 illustrates an example steering system 800 of a vehicle according to at least one embodiment of the present disclosure. As shown in FIG. 8, a steering system 800 of a vehicle according to an embodiment of the present disclosure may include a first control circuit 810 and an electronically controlled steering system 820. The electronically controlled steering system 820 may include a hydraulic control system, steering knuckles provided at respective steering vehicle wheels, and hydraulic wheel cylinders connected with respective steering knuckles through piston rods. The first control circuit 810 may be, for example, the control circuit 701 shown in FIG. 7. The first control circuit 810 may be configured to perform the electronically controlled steering method according to the embodiments of the present disclosure. Additionally, the steering system 800 of the vehicle may further include a second control circuit (not shown) (e.g., the control circuit 702 in FIG. 7). When a failure occurs in the first control circuit 810, the second control circuit may take over the control and perform the electronically controlled steering method according to the embodiments of the present disclosure. In a case that the steering system 800 of the vehicle further includes the second control circuit, both the first control circuit 801 and the second control circuit may respectively determine the target steering radiuses and the target piston positions, and cross-check the determined target steering radiuses and target piston positions.

In addition, the present disclosure further provides a vehicle including a steering system of the vehicle according to the embodiments of the present disclosure (e.g., steering system 800 of the vehicle shown in FIG. 8).

So far, the present disclosure describes the electronically controlled steering method, the steering system of the vehicle and the vehicle including the same according to the embodiments of the present disclosure in conjunction with FIGS. 1 to 8. The electronically controlled steering method according to the embodiments of the present disclosure can support various steering postures of the vehicle, which contributes to the smooth and rapid steering for vehicle. Moreover, adjusting, based on the feedback of both the target steering radius and the target piston positions described in conjunction with FIG. 3, the target steering radius and the target piston positions determined based on the received steering parameters, can make the determined target steering radius and target piston positions more accurate. In addition, the electronically controlled steering method according to the embodiments of the present disclosure can determine other piston positions of the pistons of the hydraulic wheel cylinders corresponding to the steering vehicle wheels without steering failure in a case that a failure occurs in one or more of the steering vehicle wheels, thus achieving the desired steering in a case that a failure occurs in a steering vehicle wheel.

It should be noted that the above descriptions are only some of the embodiments of the present disclosure and illustrations of the applied technical principles. It should be understood by those skilled in the art that the disclosed scope involved in the present disclosure is not limited to the technical scheme formed by a specific combination of the above technical features, and meanwhile, shall also encompass other technical schemes formed by any combination of the above technical features or the equivalent features thereof without departing from the above disclosed concept, for example, the technical schemes formed by mutual substitution of the above features with (but not limited to) the technical features with similar functions disclosed in the present disclosure.

In addition, although various operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Certain features described in the context of separate embodiments can also be implemented in combination in a single embodiment. On the contrary, various features described in the context of a single embodiment can also be implemented in multiple embodiments separately or by means of any suitable sub-combination.

Although the subject matter has been described in language specific to structural features and/or methodological logical acts, it should be understood that the subject matter defined in the appended claims is not necessarily limited to the specific features or acts described above. On the contrary, the specific features and acts described above are merely example implementations of the claims.

What is claimed is:

1. An electronically controlled steering method for a vehicle including an electronically controlled steering system, the electronically controlled steering system including a hydraulic control system, steering knuckles disposed at respective steering vehicle wheels, and hydraulic wheel cylinders connected with respective steering knuckles through piston rods, the method comprising:

receiving steering parameters, including steering input torque, a steering input angle, vehicle speed, lateral acceleration of the vehicle and actual piston positions of pistons of the respective hydraulic wheel cylinders;

determining a target steering radius for the vehicle and target piston positions of the pistons of the respective hydraulic wheel cylinders based on the steering parameters;

controlling, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering;

determining other target piston positions of the pistons of the respective hydraulic wheel cylinders corresponding to the steering vehicle wheels without steering failure of the respective steering vehicle wheels based on the steering parameters, when a steering failure occurs in one or more steering vehicle wheels of the respective steering vehicle wheels; and controlling, based on the determined other target piston positions, the hydraulic control system to change the hydraulic pressures of the respective hydraulic wheel cylinders corresponding to the steering vehicle wheels without steering failure to change the positions of the pistons thereof, so as to drive, through the piston rods, the steering knuckles connected therewith to deflect the corresponding steering vehicle wheels for steering.

2. The method according to claim 1, wherein determining the target steering radius and the target piston positions of the pistons of the respective hydraulic wheel cylinders comprises:

determining an actual steering radius for the vehicle based on the vehicle speed and the lateral acceleration of the vehicle; and determining the target steering radius and the target piston positions of the pistons of the respective hydraulic wheel cylinders based on the actual steering radius, the steering input torque, the steering input angle, the vehicle speed, and the actual piston positions of the pistons of the respective hydraulic wheel cylinders.

3. The method according to claim 2, wherein the target steering radius and the target piston positions are used as feedback to determine the target steering radius and the target piston positions at next timing through closed-loop control.

4. The method according to claim 3, wherein determining the target steering radius and the target piston positions at the next timing comprises:

determining the actual steering radius at the next timing based on received vehicle speed and lateral acceleration of the vehicle at the next timing;

determining a steering radius difference between the target steering radius and the actual steering radius at the next timing;

determining piston position differences between the target piston positions and the received actual piston positions at the next timing; and determining the target steering radius and the target piston positions at the next timing by using received steering input torque, steering input angle, and vehicle speed at the next timing, the steering radius difference and the piston position differences, as inputs to a look-up table for determining target steering radius and target piston position.

5. The method according to claim 2, wherein the lateral acceleration of the vehicle is lateral accelerations of the respective steering vehicle wheels of the vehicle, the actual steering radius is actual steering radiuses of the respective steering vehicle wheels of the vehicle, and the target steering radius is target steering radiuses of the respective steering vehicle wheels of the vehicle.

6. The method according to claim 1, wherein the steering input torque and the steering input angle are manually input, or determined based on a steering request from an automatic driving system or a driving assistance system of the vehicle.

7. The method according to claim 1, wherein determining the other target piston positions based on the steering parameters comprises:

determining an actual steering radius for the vehicle based on the vehicle speed and the lateral acceleration of the vehicle; and determining the other target piston positions based on the actual steering radius, the steering input torque, the steering input angle, the vehicle speed, and the actual piston positions of the pistons of the respective hydraulic wheel cylinders corresponding to the steering vehicle wheels without steering failure.

8. The method according to claim 1, wherein determining the other target piston positions based on the steering parameters comprises:

determining an indication of a steering direction based on the steering input angle; and determining the other target piston positions by using the target steering radius and the indication of the steering direction, as inputs to a look-up table for determining the target piston position corresponding to the steering vehicle wheels without steering failure.

9. The method according to claim 1, wherein the electronically controlled steering system includes a first control circuit and a second control circuit, and the first control circuit and the second control circuit control the hydraulic control system independently, the method further comprising:

controlling, by the first control circuit, the hydraulic control system based on the target piston positions of the pistons of the respective hydraulic wheel cylinders that it determines; and controlling, by the second control circuit, the hydraulic control system based on the target piston positions of the pistons of the respective hydraulic wheel cylinders that it determines, when a failure occurs in the first control circuit.

10. The method according to claim 9, further comprising:

determining, by both the first control circuit and the second control circuit, the target steering radiuses and the target piston positions respectively; and cross-checking the target steering radiuses and the target piston positions determined by the first control circuit and the second control circuit.

11. The method according to claim 1, wherein the steering vehicle wheels include a left front wheel and a right front wheel of the vehicle, or wherein the steering vehicle wheels include all wheels of the vehicle.

12. A steering system of a vehicle, the steering system comprising:

an electronically controlled steering system including a hydraulic control system, steering knuckles disposed at respective steering vehicle wheels, and hydraulic wheel cylinders connected with the respective steering knuckles through piston rods; and a first control circuit configured to:

receive steering parameters, including steering input torque, a steering input angle, vehicle speed, lateral acceleration of the vehicle and actual piston positions of pistons of the respective hydraulic wheel cylinders;

determine a target steering radius for the vehicle and target piston positions of the pistons of the respective hydraulic wheel cylinders based on the steering parameters;

control, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering;

determine other target piston positions of the pistons of the respective hydraulic wheel cylinders corresponding to the steering vehicle wheels without steering failure of the respective steering vehicle wheels based on the steering parameters, when a steering failure occurs in one or more steering vehicle wheels of the respective steering vehicle wheels; and control, based on the determined other target piston positions, the hydraulic control system to change the hydraulic pressures of the respective hydraulic wheel cylinders corresponding to the steering vehicle wheels without steering failure to change the positions of the pistons thereof, so as to drive, through the piston rods, the steering knuckles connected therewith to deflect the corresponding steering vehicle wheels for steering.

13. The steering system according to claim 12, wherein to determine the target steering radius and the target piston positions of the pistons of the respective hydraulic wheel cylinders, the first control circuit is configured to:

determine an actual steering radius for the vehicle based on the vehicle speed and the lateral acceleration of the vehicle; and determine the target steering radius and the target piston positions of the pistons of the respective hydraulic wheel cylinders based on the actual steering radius, the steering input torque, the steering input angle, the vehicle speed, and the actual piston positions of the pistons of the respective hydraulic wheel cylinders.

14. The steering system according to claim 12, wherein to determine the other target piston positions based on the steering parameters, the first control circuit is configured to:

determine an actual steering radius for the vehicle based on the vehicle speed and the lateral acceleration of the vehicle; and determine the other target piston positions based on the actual steering radius, the steering input torque, the steering input angle, the vehicle speed, and the actual piston positions of the pistons of the respective hydraulic wheel cylinders corresponding to the steering vehicle wheels without steering failure.

15. The steering system according to claim 12, wherein to determine the other target piston positions based on the steering parameters, the first control circuit is configured to:

determine an indication of a steering direction based on the steering input angle; and determine the other target piston positions by using the target steering radius and the indication of the steering direction, as inputs to a look-up table for determining the target piston position corresponding to the steering vehicle wheels without steering failure.

16. The steering system according to claim 12, further comprising:

a second control circuit, configured to, when a failure occurs in the first control circuit, perform steps of:

receiving steering parameters, including steering input torque, a steering input angle, vehicle speed, lateral acceleration of the vehicle and actual piston positions of pistons of the respective hydraulic wheel cylinders;

determining a target steering radius for the vehicle and target piston positions of the pistons of the respective hydraulic wheel cylinders based on the steering parameters; and controlling, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering.

17. The steering system according to claim 16, wherein the first control circuit and the second control circuit are further configured to determine target steering radiuses and target piston positions, respectively, and cross-check the determined target steering radiuses and target piston positions.

18. An electronically controlled steering method for a vehicle including an electronically controlled steering system, the electronically controlled steering system including a hydraulic control system, steering knuckles disposed at respective steering vehicle wheels, and hydraulic wheel cylinders connected with respective steering knuckles through piston rods, the method comprising:

receiving steering parameters, including steering input torque, a steering input angle, vehicle speed, lateral acceleration of the vehicle and actual piston positions of pistons of the respective hydraulic wheel cylinders;

determining a target steering radius for the vehicle and target piston positions of the pistons of the respective hydraulic wheel cylinders based on the steering parameters; and controlling, based on the determined target piston positions, the hydraulic control system to change hydraulic pressures in the respective hydraulic wheel cylinders to change positions of the pistons thereof, so as to drive, through the piston rods, the steering knuckles connected therewith to deflect the corresponding steering vehicle wheels for steering;

wherein determining the target steering radius and the target piston positions of the pistons of the respective hydraulic wheel cylinders comprises:

determining an actual steering radius for the vehicle based on the vehicle speed and the lateral acceleration of the vehicle; and determining the target steering radius and the target piston positions of the pistons of the respective hydraulic wheel cylinders based on the actual steering radius, the steering input torque, the steering input angle, the vehicle speed, and the actual piston positions of the pistons of the respective hydraulic wheel cylinders;

wherein the target steering radius and the target piston positions are used as feedback to determine the target steering radius and the target piston positions at next timing through closed-loop control; and wherein determining the target steering radius and the target piston positions at the next timing comprises:

determining the actual steering radius at the next timing based on received vehicle speed and lateral acceleration of the vehicle at the next timing;

determining a steering radius difference between the target steering radius and the actual steering radius at the next timing;

determining piston position differences between the target piston positions and the received actual piston positions at the next timing; and determining the target steering radius and the target piston positions at the next timing by using received steering input torque, steering input angle, and vehicle speed at the next timing, the steering radius difference and the piston position differences, as inputs to a look-up table for determining target steering radius and target piston position.

* * * * *